(12) United States Patent
Queveau et al.

(10) Patent No.: US 7,667,416 B2
(45) Date of Patent: Feb. 23, 2010

(54) ELECTRICAL POWER SUPPLY SYSTEM HAVING TWO BATTERIES FOR AN ELECTRIC MOTOR VEHICLE

(75) Inventors: Gérard Queveau, Le Pin (FR); Patrick Largeau, Cholet (FR)

(73) Assignee: Heuliez Electric, Cerizay (FR)

( * ) Notice: Subject to any disclaimer, the term of this patent is extended or adjusted under 35 U.S.C. 154(b) by 436 days.

(21) Appl. No.: 10/576,650

(22) PCT Filed: Oct. 21, 2004

(86) PCT No.: PCT/FR2004/002696

§ 371 (c)(1),
(2), (4) Date: Apr. 20, 2006

(87) PCT Pub. No.: WO2005/039918

PCT Pub. Date: May 6, 2005

(65) Prior Publication Data

US 2007/0069586 A1    Mar. 29, 2007

(30) Foreign Application Priority Data

Oct. 22, 2003    (FR) .................................. 03 50720

(51) Int. Cl.
*H02P 3/00* (2006.01)
*H02P 5/00* (2006.01)

(52) U.S. Cl. .................... 318/139; 318/87; 318/153; 318/376

(58) Field of Classification Search ................ 318/119, 318/87, 153, 376
See application file for complete search history.

(56) References Cited

U.S. PATENT DOCUMENTS

| | | | | |
|---|---|---|---|---|
| 5,796,175 A | | 8/1998 | Itoh et al. | 307/10.1 |
| 5,969,624 A | * | 10/1999 | Sakai et al. | 340/636.1 |
| 5,998,960 A | * | 12/1999 | Yamada et al. | 320/104 |
| 6,137,250 A | * | 10/2000 | Hirano et al. | 318/376 |

FOREIGN PATENT DOCUMENTS

WO    WO 03/023934 A2    3/2003

* cited by examiner

*Primary Examiner*—Bentsu Ro
*Assistant Examiner*—Erick Glass
(74) *Attorney, Agent, or Firm*—Nawrocki, Rooney & Sivertson, P.A.

(57) ABSTRACT

An electrical power supply system for an electrically powered motor vehicle, said vehicle including an electric motor, and a transmission device for transmitting energy between the drive wheels and the motor, said vehicle further including electrical accessories, in particular an air-conditioning device. Said system comprises a first rechargeable battery serving to power the electric motor and a second rechargeable battery serving to power the electrical accessories of the vehicle, the batteries being connected in parallel to the motor. The invention also relates to a method for controlling such a system.

10 Claims, 4 Drawing Sheets

ELECTRICAL POWER SUPPLY SYSTEM HAVING TWO BATTERIES FOR AN ELECTRIC MOTOR VEHICLE

BACKGROUND OF THE INVENTION

The invention relates to an electrical power supply system for an electrically powered motor vehicle, to a method for controlling such a power supply system, and to an electrically powered motor vehicle including such an electrical power supply system.

In order to approach the comfort and performance of motor vehicles having internal combustion engines, in terms of speed, acceleration, and range, it is known that electric vehicles can be equipped with batteries of the Lithium-metal-polymer type whose performance levels are considerably higher than those offered by previous-generation technologies, and in particular by the Ni—Cd batteries of "first-generation" electric vehicles.

However, acceleration and driving at high speeds cause such a battery to be discharged considerably due to the high power levels required by the motors of such electric vehicles. Such considerable discharging deteriorates batteries of the Lithium-metal-polymer type, and considerably reduces their lives.

Batteries of the Lithium-ion type are capable of delivering very high currents without any significant degradation in their performance.

However, batteries of that type have low energy per unit volume, and are more costly than batteries of the Lithium-metal-polymer type.

Therefore, in view of the constraints in terms of compactness and cost, use of them for powering the electric motor of a motor vehicle does not make it possible to obtain energy sufficient to achieve the objectives of range and of comfort.

In addition, the accessories, in particular the air-conditioning device, require a large quantity of electrical energy.

Document U.S. Pat. No. 5,796,175 discloses an electrical power supply system for an electrically powered motor vehicle, said vehicle including an electric motor, a transmission device for transmitting energy between the drive wheels and the motor, and electrical accessories, in particular an air-conditioning device, said system comprising a first rechargeable battery serving to power the electric motor and a second rechargeable battery serving to power the electrical accessories of the vehicle.

Document WO 03/023934 discloses a switch device for switching between two batteries for starting a motor vehicle. However, that document does not suggest using such a switch for traction of an electric vehicle, which, as indicated above, poses particular problems in terms of comfort and of performance, in particular because the energy necessary for the electric motor varies.

SUMMARY OF THE INVENTION

An object of the invention is to optimize the electrical power supply necessary for all of the functions of the vehicle by proposing a system in which the electric motor of a motor vehicle is powered by a first battery, and the accessories and in particular the air-conditioning device are powered by a second battery.

To this end, and in a first aspect, the invention provides an electrical power supply system for an electrically powered motor vehicle, said vehicle including an electric motor, a transmission device for transmitting energy between the drive wheels and the motor, and electrical accessories, in particular an air-conditioning device, said system comprising a first rechargeable battery serving to power the electric motor and a second rechargeable battery serving to power the electrical accessories of the vehicle, said system being characterized in that the first battery and the second battery are connected in parallel to said motor via a switch device, said switch device being arranged to switch the current for powering the motor between the batteries as a function of at least one energy threshold.

Thus, in such a system, the first battery can be relayed by the second battery for the purpose of powering the motor, in particular when the first battery is discharged or during particular phases of driving.

In a second aspect, the invention provides a method for controlling an electrical power supply system for an electrically powered motor vehicle as defined above, said method consisting in:

acting, when the energy delivered by the first battery is greater than a discharge energy threshold, to cause the motor to be powered by the first battery so as to drive the drive wheels via the transmission device; and acting, when the energy delivered by the first battery is less than the discharge energy threshold, to activate the switch device so as to cause the motor to be powered by the second battery, and so as to drive the wheels via the transmission device.

In one implementation, the method further consists in:

acting, when the energy necessary for the motor is greater than a low energy threshold, to cause the motor to be powered by the first battery so as to drive the drive wheels via the transmission device; and acting, when the energy necessary for the motor is less than the low energy threshold, to activate the switch device so as to cause the motor to be powered by the second battery and so as to drive the wheels via the transmission device.

In another implementation, the method further consists in acting, in the event of deceleration, to cause the switch device to be activated so as to deliver a recharging current essentially to the first battery by transmission of energy from the wheels to the motor.

In a third aspect, the invention provides an electrically powered motor vehicle including electrical accessories, said motor vehicle being characterized in that it includes an electrical power supply system as described above.

BRIEF DESCRIPTION OF THE DRAWINGS

Other objects and advantages of the invention appear from the following description given with reference to the accompanying drawings, in which.

DETAILED DESCRIPTION OF THE INVENTION

Figure 1:
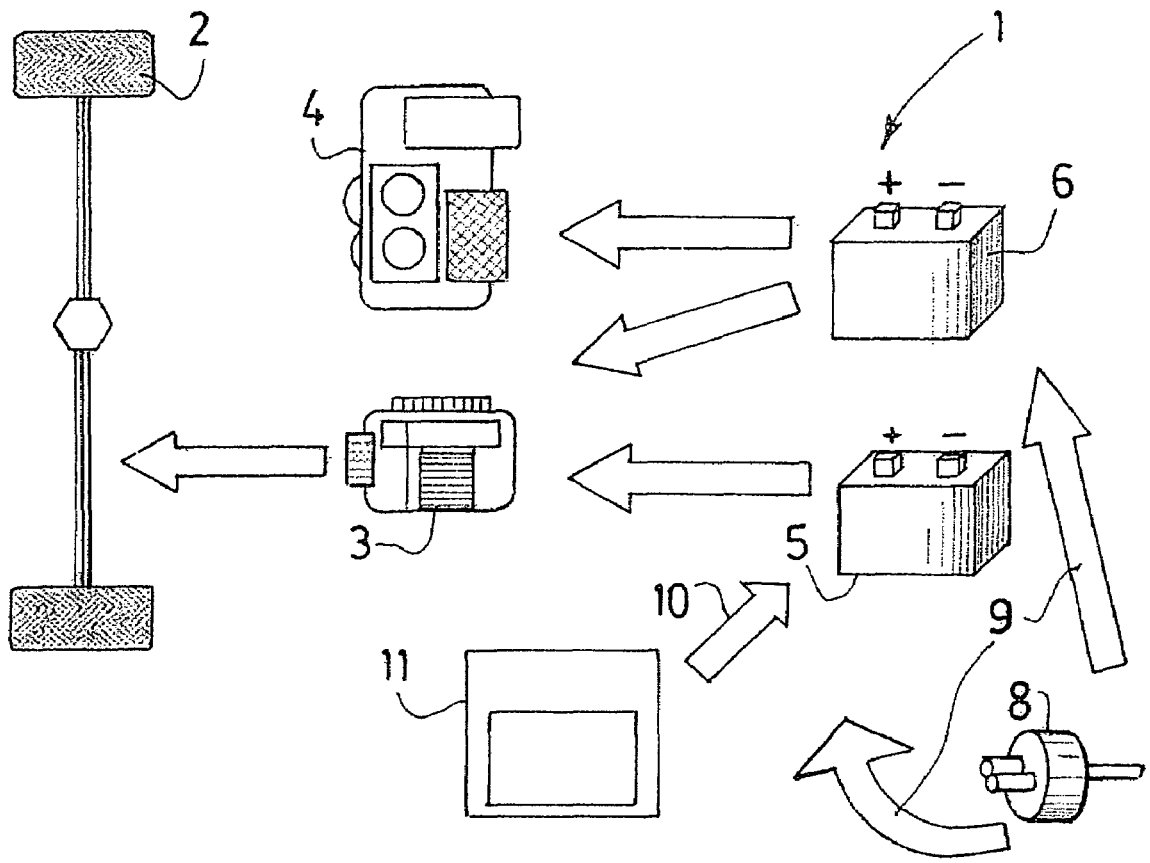
FIG. 1 is a diagram showing the energy flows between the various elements during charging of an electrical power supply system of an electric vehicle of the invention.

FIGS. 1 to 5 show a power supply system 1 for powering the drive wheels 2 of an electrically powered motor vehicle.

In the figures, only two drive wheels are shown on a single axle. The axle may be the front axle or the rear axle of a motor vehicle. In other embodiments, both the front and the rear axles carry drive wheels 2.

The electrically powered motor vehicle includes an electric motor 3 and a transmission device (not shown) for transmitting energy between the drive wheels 2 and the motor 3. The electric vehicle also includes electrical accessories 4 such as, for example, devices for air-conditioning, for heating, for power-assisted steering, for power-assisted braking, and for recharging the 12 V service battery.

In parallel, the system 1 includes a first rechargeable battery 5 serving to power the electric motor 3 and a second rechargeable battery 6 serving to power the electrical accessories 4 of the vehicle.

In a particular embodiment, the first battery 5 is of the Lithium-ion or Lithium-ion-polymer type.

This type of battery is capable of delivering the current necessary for the motor, even during phases requiring high power, such as acceleration or driving at constant high speed. By means of the high discharge capacity of a battery of the Lithium-ion or Lithium-ion-polymer type, the high currents received by the motor impart sufficient power to it. Through appropriate choice of the maximum power of the battery, it is possible to avoid the Ragone effect, i.e. reduction in available energy as a function of delivered power, while also preserving the life of the battery.

In particular, the first battery 5 is capable of delivering power of about 40 kW during constant-speed driving, and of about 55 kW during acceleration.

In addition, the second battery 6 is a battery of the Lithium-metal-polymer type. In a particular example, the second battery 6 is capable of delivering power of about 15 kW.

FIG. 1 shows charging of the batteries 5 and 6. For this purpose, the batteries can be connected to an electrical terminal or to a mains outlet 8 for slow recharging, represented by the arrows 9.

In addition, unlike the second battery 6 of the Lithium-metal-polymer type, the first battery 5 of the Lithium-ion or Lithium-ion-polymer type is capable of receiving high charging currents of about C/1 or 2C, where C is the capacity of the battery. Fast charging, represented by the arrow 10, via an external power charger 11, can thus be performed on the first battery 5. For example, said charger 11 can be in the form of a terminal.

Figure 2:
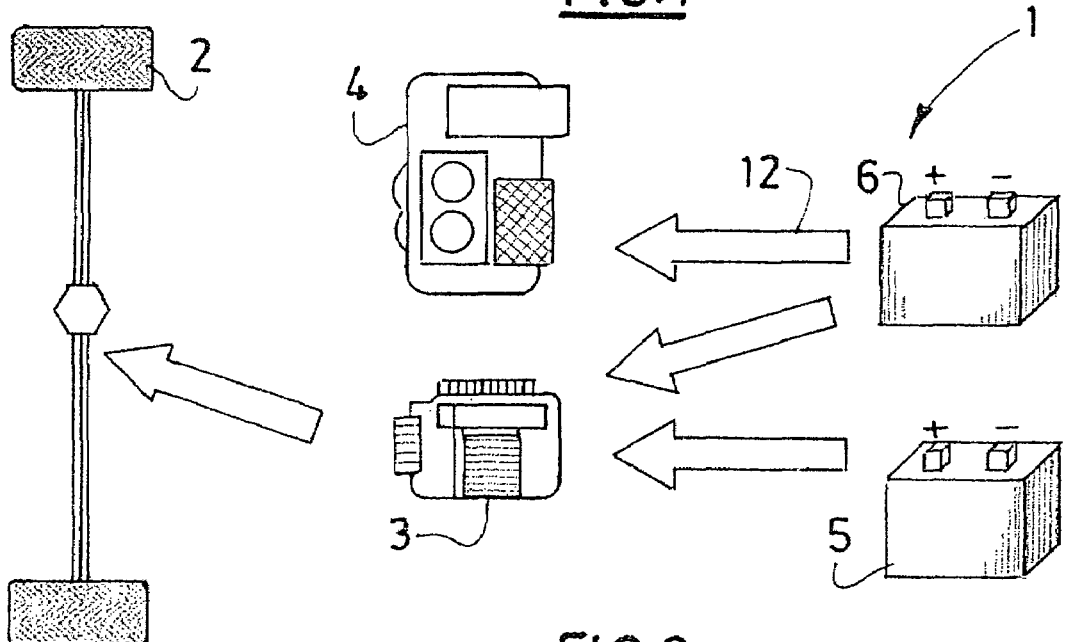
FIG. 2 is a diagram showing the energy flows in an electrical power supply system of the invention, the electrical accessories being powered by the second battery.

FIG. 2 shows the power supply system 1 in which the second battery 6 transmits energy (arrow 12) to the electrical accessories 4 of the vehicle.

In a particular embodiment, the first battery 5 and the second battery 6 are connected to the motor 3 via a switch device 5A. Said switch device is arranged to switch the power supply current for the motor 3 between the batteries 5, 6 as a function of at least one energy threshold.

For this purpose, the switch device include means for measuring the energy delivered by the first battery, electronic means for storing the energy thresholds, and electronic means for comparing the delivered energy with said energy thresholds.

The various operating modes of the power supply system 1 for powering an electric vehicle are described below.

Figure 3:
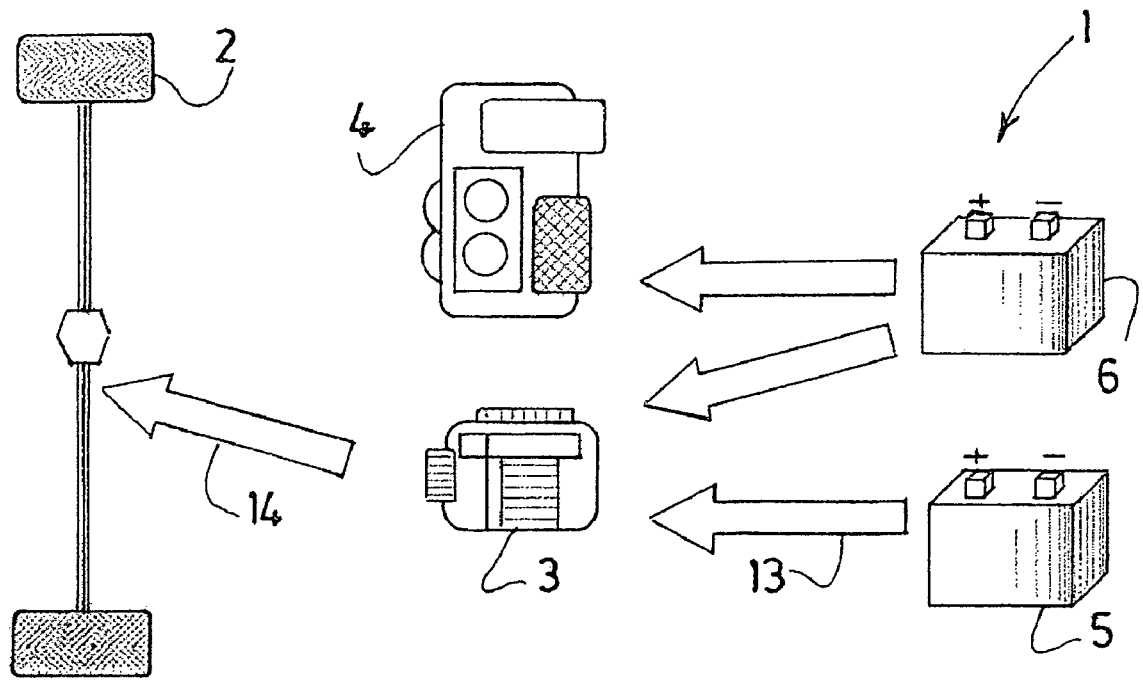
FIG. 3 is a diagram showing the energy flows in an electrical power supply system of the invention, the motor being powered by the first battery.

FIG. 3 shows a system 1 in "normal" operating mode. Arrow 13 represents the energy delivered by the first battery 5 to the electric motor 3 for powering it. The motor 3 then transmits the power (arrow 14) for driving the drive wheels 2, via the transmission device. This operating mode is provided when the energy delivered by the first battery 5 is higher than a discharge energy threshold. Said discharge energy threshold of the first battery 5 is a predetermined value for which the energy delivered by the second battery 6 is not sufficient for the motor to have the power necessary to move the vehicle.

Figure 4:
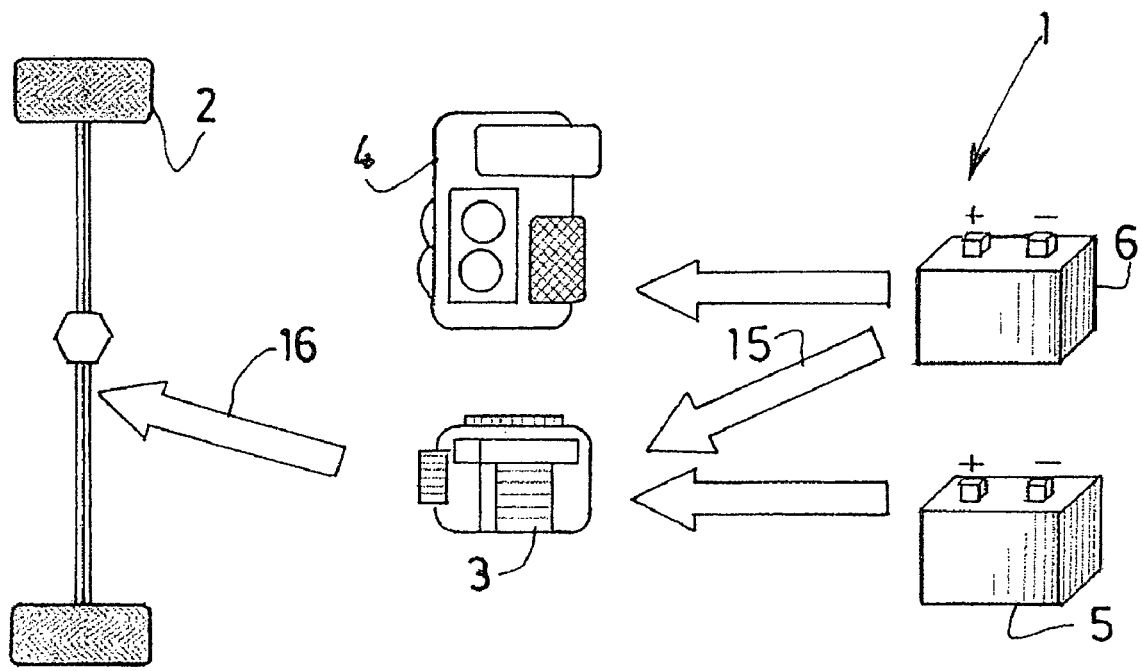
FIG. 4 is a diagram showing the energy flows in an electrical power supply system of the invention, the motor being powered by the second battery.

When the energy delivered by the first battery 5 is less than the discharge energy threshold, the system 1 operates in range-extending mode. The switch device 5A is then activated so as to power the motor 3 via the second battery 6 and so as to drive the wheels 2 via the transmission device. The arrows 15, 16 of FIG. 4 represent the energy flows respectively between the second battery and the motor, and between the motor and the drive wheels.

In one embodiment, when the energy necessary for the motor 3 is greater than a low energy threshold, the motor 3 is powered by the first battery 5 so as to drive the drive wheels 2 via the transmission device.

When the energy necessary for the motor 3 is less than the acceleration energy threshold, the switch device is activated, and the current for powering the motor 3 is switched over from the first battery 5 to the second battery 6.

In a particular example, the low energy threshold, of the order of a few kilowatts, is reached for low speeds lower than about 20 kilometers per hour (k.p.h.).

Therefore, by using the second battery 6 in phases in which the currents necessary for the motor 3 are not too high, it is possible to limit the volume, the capacity, and thus the cost of the first battery 5 of the Lithium-ion or Lithium-ion-polymer type.

In addition, since the second battery 6 is used only during phases in which the power requested ranges from a few kilowatts (kW) to 15 kW in the energy-extending mode, its discharge does not exceed C/1, where C is the capacity of the battery, thereby making it possible to avoid the Ragone effect.

Figure 5:
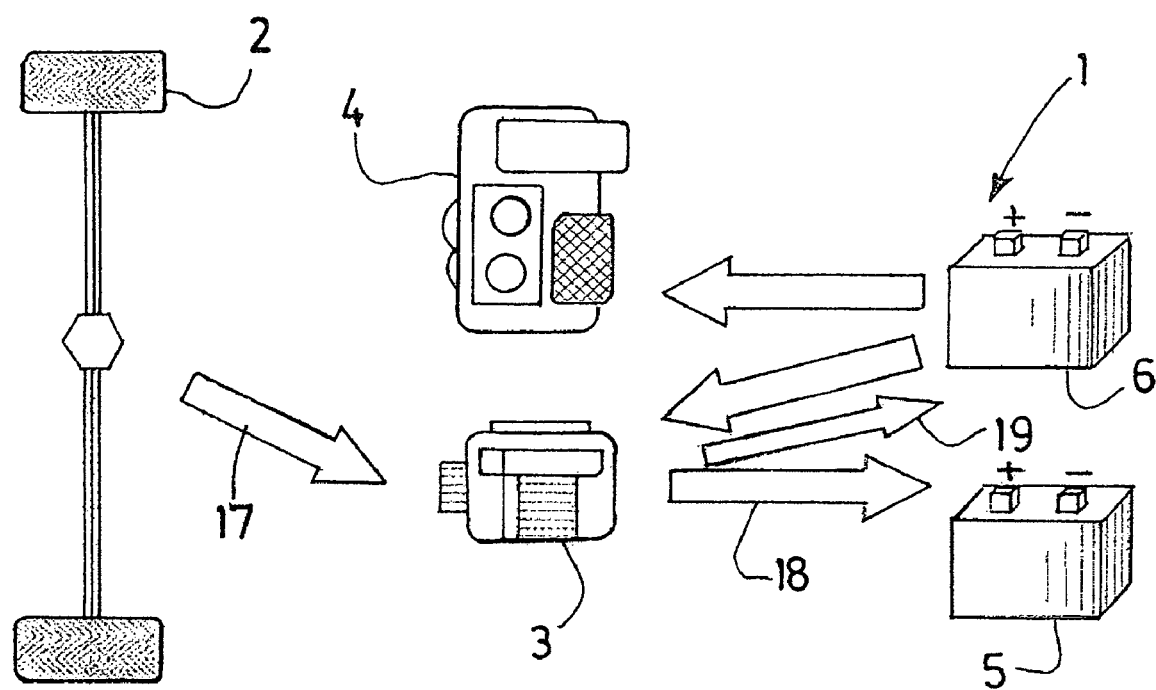
FIG. 5 is a diagram showing the flows in an electrical power supply system of the invention during transmission of energy from the wheels to the motor during a deceleration phase.
Figure 6:
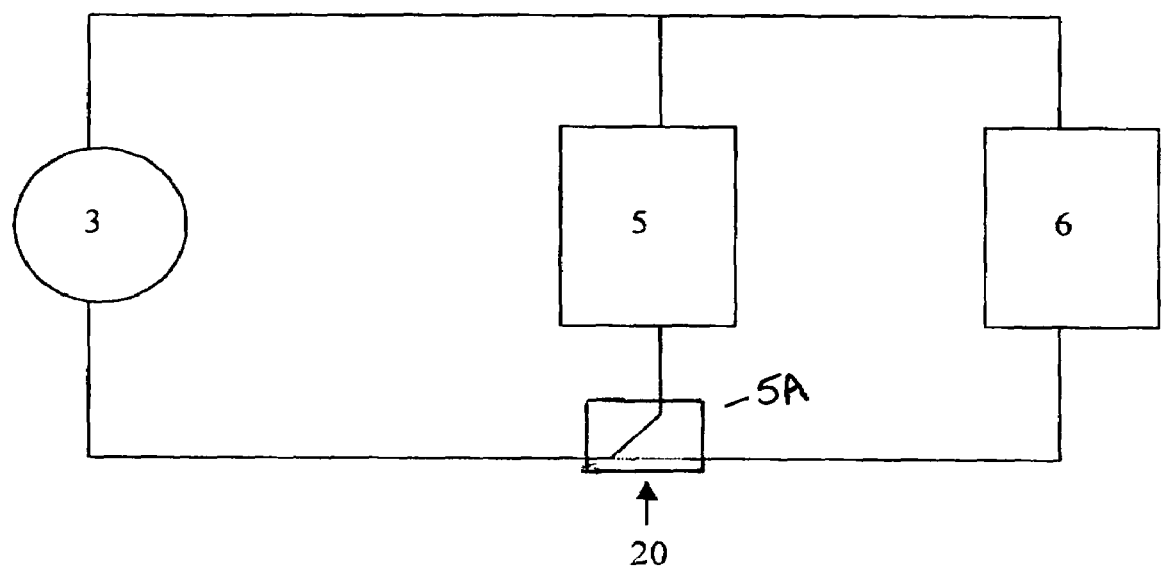
FIG. 6 is a diagram showing first battery 5 and second battery 6 connected to switch device 5A.

FIG. 5 shows a mode for recovering the energy due to the wheels 2 rotating. In this operating mode, in the event of deceleration, the rotation of the wheels 2 enables the motor 3 to take up energy (arrow 17) via the transmission device. The switch device is then activated so as to distribute the recharging currents. Said currents are switched either in full (arrow 18) towards the first battery 5 which accepts high charging currents, or else they are switched in part theretowards. In which case, the switch device switches a sufficiently small fraction of the recharging currents (arrow 19) to the second battery 6 so as not to damage it.

The invention claimed is:

1. An electrical power supply system for an electrically powered motor vehicle, said vehicle including an electric motor, a transmission device for transmitting energy between the drive wheels and the motor, and electrical accessories, in particular an air-conditioning device, said system comprising a first rechargeable battery serving to power the electric motor and a second rechargeable battery serving to power the electrical accessories of the vehicle, said system being characterized in that the first battery and the second battery are connected in parallel to said motor via a switch device, said switch device being arranged to conduct current for powering the motor from the first and second batteries as a function of a first energy threshold, said first energy threshold being a predetermined value for which the energy delivered by the first battery only is not sufficient for accelerating the vehicle, and said switch device conducting current from the second battery only to the motor as a function of a second energy threshold for the energy from the first battery, said second energy threshold lower than the first energy threshold.

2. A system according to claim 1, wherein the first battery is a battery of the Lithium-ion or Lithium-ion-polymer type.

3. A system according to claim 1, wherein the second battery is a battery of the Lithium-metal-polymer type.

4. A system according to claim 1, wherein the first battery is capable of delivering power in the range of 40 kW to 55 kW.

5. A system according to claim 1, wherein the second battery is capable of delivering power of about 15 kW.

6. A method of controlling an electrical power supply system for an electric motor for powering a vehicle according to claim 1, wherein:
when the energy delivered by the first battery is greater than a discharge energy threshold, providing power to the motor from the first battery so as to drive the drive wheels via the transmission device; and
sensing the energy delivered by the first battery, and when said first battery energy delivered is less than the discharge energy threshold, activating the switch device to conduct current to the motor from the second battery, to drive the wheels via the transmission device.

7. A method according to claim 6, wherein:
when the energy necessary for the motor is greater than a low energy threshold, activating the switch device to conduct current to the motor from the first battery to drive the drive wheels via the transmission device; and
when the energy necessary for the motor is less than the low energy threshold, activating the switch device to provide power to the motor from the second battery to drive the wheels via the transmission device.

8. A method according to claim 6, including the steps of:
sensing deceleration of the vehicle, and
while sensing deceleration, activating the switch device to distribute recharging current to the first and second batteries from the motor as a function of the allowable charging rates for the first and second batteries.

9. A method according to claim 7, including the steps of:
sensing deceleration of the vehicle, and
while sensing deceleration, activating the switch device to distribute a recharging current to the first and second batteries from the motor as a function of the allowable charging rates for the first and second batteries.

10. The system of claim 1, wherein the switch device conducts current to the motor from the first battery when the motor energy exceeds a third threshold value, said third threshold value less than the first energy threshold and greater than the second energy threshold.

* * * * *